United States Patent [19]

Siebert

[11] 4,025,578
[45] May 24, 1977

[54] ELASTOMERIC LIQUID POLYMER VULCANIZATES FROM EPOXY RESIN, LIQUID CARBOXY TERMINATED POLYMER, DIHYDRIC PHENOL, AND AN AMINE

[75] Inventor: Alan R. Siebert, Maple Heights, Ohio

[73] Assignee: The B. F. Goodrich Company, Akron, Ohio

[22] Filed: May 9, 1975

[21] Appl. No.: 576,045

Related U.S. Application Data

[63] Continuation-in-part of Ser. No. 391,219, Aug. 24, 1973, abandoned.

[52] U.S. Cl. .................... 260/837 R; 260/42.48; 260/836
[51] Int. Cl.² .................. C08L 33/00; C08L 63/02
[58] Field of Search ...................... 260/837, 836

[56] References Cited

UNITED STATES PATENTS

| | | | |
|---|---|---|---|
| 3,100,160 | 8/1963 | Korpman | 260/836 |
| 3,324,198 | 6/1967 | Gruver | 260/836 |
| 3,655,818 | 4/1972 | McKown | 260/836 |
| 3,678,131 | 7/1972 | Klapprott et al. | 260/837 |

Primary Examiner—Murray Tillman
Assistant Examiner—A. H. Koeckert
Attorney, Agent, or Firm—Alan A. Csontos

[57] ABSTRACT

An elastomeric liquid polymer vulcanizate is prepared by admixing a major amount of a liquid carboxyl-terminated polymer, a minor amount of a dihydric compound, and a small amount of an amine having selectivity for a carboxyl-epoxide reaction with an epoxy resin having about two epoxide

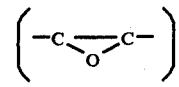

groups per molecule, casting the mixture in a mold, and heating it at from about 110° C. to about 180° C. until the composition cures. The vulcanizate has elastomeric properties, and is characterized by having two distinct polymer phases and having an ultimate tensile strength of over 1000 pounds per square inch and an elongation of over about 140 percent.

12 Claims, No Drawings

ELASTOMERIC LIQUID POLYMER VULCANIZATES FROM EPOXY RESIN, LIQUID CARBOXY TERMINATED POLYMER, DIHYDRIC PHENOL, AND AN AMINE

CROSS REFERENCE TO RELATED APPLICATION

This application is a Continuation-in-Part of application Ser. No. 391,219 filed on Aug. 24, 1973, now abandoned.

BACKGROUND OF THE INVENTION

The use of epoxy resins to cure liquid carboxyl-containing polymers is known. This cure can be accelerated by the use of catalysts such as amines. However, a curable composition designed around molar equivalents of carboxyl and epoxide yields a weak, gummy vulcanizate. To obtain stronger cures, a molar excess of epoxide can be used. For example, U.S. Pat. No. 3,285,949 shows that a carboxyl-terminated polybutadiene rubber cured using a small molar excess of epoxy resin can yield vulcanizates having tensile strengths up to about 500 psi and elongations of 500 to 700%. Unfortunately, these vulcanizate properties are not sufficient for many applications such as molded auto parts and accessories. Further increasing the molar ratio of epoxy resin to liquid carboxyl-terminated polymer does increase the tensile strength of the vulcanizate. However, in obtaining increased tensile strength, elastomeric properties are sacrificed and the vulcanizate is more like a hard rubber or plastic than an elastomer. For example, a mix of 100 parts by weight of a diepoxy resin and 100 parts by weight of a carboxyl-terminated polymer, cured using an amine catalyst, yields a vulcanizate having up to 2000 psi tensile, but it will also have low elongation (rarely exceeding 100 percent), a high hardness, and a high Gehman Freeze point.

Simply adding reinforcing ingredients to a liquid polymer vulcanizable composition does not supply a totally satisfactory solution. Tensile strength can be increased with the addition of carbon black (see Liquid Butadiene/Acrylonitrile Polymers with Reactive Terminals by Drake and McCarthy, Rubber World, Oct., 1968; where ulimate tensile strengths of 1000 to 1500 psi were obtained without significant loss of rubbery properties). Unfortunately, a polymer mix containing sufficient carbon black (or any filler) to significantly improve the tensile is extremely viscous, resembling a thick putty. The vulcanizable polymer mix is not fluid and is not castable. Hence, one of the major advantages of using liquid polymers (i.e. their ability to flow in place prior to cure) is lost.

SUMMARY OF THE INVENTION

Elastomeric vulcanizates, having at ambient temperatures an ultimate tensile strength of over 1000 psi and an elongation of at least about 140 percent and characterized by having two distinct polymer phases, i.e. a continuous elastomeric phase and a hard discrete particulate phase, said particles being from about 100 A to about $5\mu$ in diameter, are prepared from liquid polymer compositions which are flowable and castable at application temperatures (room temperature to about 100° C.). The liquid polymer compositions contain 100 parts by weight of an epoxy resin having about two epoxide

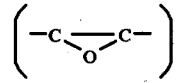

groups per molecule, from about 100 parts to about 250 parts by weight of a liquid carboxyl-terminated polymer having from about 1.6 to about 2.4 carboxyl (—COOH) groups per molecule and having a polymeric backbone consisting of carbon-carbon or carbon-oxygen linkages, from about 3 parts to about 36 parts by weight of a dihydric compound, and from about 2 parts to about 10 parts by weight of an amine having selectivity for a carboxyl-epoxide reaction. The vulcanizates are prepared in a process comprising admixing the compounds of the liquid polymer composition, casting the composition into a mold, and heating it at from about 110° C. to about 180° C. until the composition is cured.

DETAILED DESCRIPTION

The liquid polymer compositions contain 100 parts by weight of an epoxy resin, from about 100 parts to about 250 parts by weight of a liquid carboxyl-terminated polymer, from about 3 parts to about 36 parts by weight of a dihydric compound, and from about 2 parts to about 10 parts by weight of an amine having selectively for a carboxyl-epoxide reaction. More preferred, the epoxy resin is used at 100 parts by weight, the liquid polymer at from about 140 to about 225 parts by weight, the dihydric compound at from about 15 parts to about 30 parts by weight, and the amine at from about 4 to about 8 parts by weight.

The epoxy resin employed has an average of about two epoxide

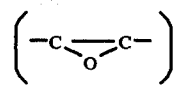

groups per molecule. However, because the epoxy resins are prepared by processes which do not yield perfectly all difunctional epoxy resins, the epoxy resins used will, as a practical matter, have an average number of epoxide groups per molecule of from slightly below to slightly above two epoxide groups per molecule. Hence, the epoxy resin employed will have an average of from 1.7 1 to 2.3 epoxide groups per molecule. An epoxy resin having substantially above or below this range of epoxide groups per molecule will not function to prepare the unique elastomeric vulcanizate of this invention. It is believed that epoxy resins having below an average of 1.7 epoxide groups per molecule do not undergo chain-extension and/or crosslinking sufficiently enough, and that epoxy resins having above 2.3 epoxide groups per molecule undergo too much crosslinking to prepare the novel vulcanizates. For example, when an epoxy resin having three epoxide groups per molecule is used in direct replacement (by weight) for diepoxide resin in the vulcanizable composition, a very low elongation vulcanization is obtained. An epoxy resin having two epoxide groups per molecule, said epoxide groups located at the terminal ends of the molecule, is preferred.

The epoxy resins are liquid having a bulk viscosity (measured using a Brookfield LVT viscometer, spindle No. 7, at 0.5 to 100 rpm at 25° C.) of from about 200 centipoises to about 2,000,000 centipoises, and more preferredly from about 500 centipoises to about 500,000 centipoises. The epoxy resins can have epoxide equivalent weights from about 150 to about 1000. More preferredly, the resins have epoxide equivalent weights of from about 160 to about 400. The epoxide equivalent weight is the weight of epoxy resins that contains one gram equivalent of epoxy groups. The epoxide equivalent weight can be determined by using the pyridium chloride-pyridine method of determining epoxy content.

Many types of epoxy resins can be used. Examples of types are the diglycidyl ethers of dihydric phenols, the diglycidyl ethers of dihydric aliphatic alcohols, the diglycidyl esters of dicarboxylic acids, the diglycidyl ethers of diamino compounds, and diepoxidized fatty acids. Examples of each of these types of epoxy resins are disclosed in U.S. Pat. Nos. 3,655,818 and 3,678,131. The epoxy resins can be halogenated.

The diglycidyl ethers of dihydric phenols and the diglycidyl ethers of dialiphatic alcohols are the more preferred epoxy resins. An example of the diglycidyl ethers of dihydric phenols are the Bisphenol A/epichlorohydrin type resins such as the "Epon" resins marketed by Shell Chemical and the "D.E.R." resins marked by Dow Chemical. An example of the diglycidyl ethers of dialiphatic alcohols are the ethylene glycol/epichlorohydrin type resins marketed by Dow Chemical as the "D.E.R." 700 series resins. Properties of these two more preferred types of epoxy resins are given in the bulletin, Dow Epoxy Resins, 170-140C-5M-267. As mentioned above, although the epoxy resins used can have an average epoxide content from 1.7 to 2.3 epoxide groups per molecule, the most preferred epoxy resins have an average of about 2 epoxide groups per molecule.

The liquid polymer employed is a carboxyl-terminated polymer having a polymeric backbone consisting of carbon-carbon or carbon-oxygen linkages. The polymer has an average of from about 1.6 to about 2.4 carboxyl (COOH) groups per molecule. Preferredly, the polymer has two carboxyl groups, one located at each of the terminal ends of the polymer molecule. If the liquid polymer has terminal carboxyl groups, it can additionally have carboxyl groups located pendent to the polymer backbone. The carboxyl content of the polymers ranges from about 0.5% to about 10% by weight based upon the weight of the polymer, and more preferredly, from about 1% to about 6% by weight. Carboxyl content can be determined by titration of a polymer solution to a phenolphthalein end point using alcoholic KOH.

The liquid polymers have a molecular weight of from about 600 l to about 10,000 as measured using a Mecrolab Vapor Pressure Osmometer. The polymers are more conveniently described by their bulk viscosity. The liquid polymers have a bulk viscosity of from about 500 centipoises to about 2,000,000 centipoises (measured at 27° C. using a Brookfield Model LVT viscometer with spindle No. 7 at 0.5 to 100 rpm). More preferred, the polymers have a bulk viscosity from about 5000 centipoises to about 1,000,000 centipoises. Polymers having a bulk viscosity from about 10,000 centipoises to about 600,00 centipoises are particularly useful.

The liquid carboxyl-terminated polymers have polymeric backbones comprising carbon-carbon linkages or carbon-oxygen linkages. The polymers, if cured using conventional liquid rubber cure systems, would be elastomers in a cured state. Polymers having carbon-carbon linkages are preferred. These liquid carboxyl-terminated polymers can interpolymerize units of one or more vinylidene monomers selected from (a) mono-olefins containing 2 to about 14 carbon atoms such as ethylene, propylene, isobutylene, 1-butene, 1-pentene, 1-hexene, 1-dodecane, and the like; (b) dienes containing 4 to about 10 carbon atoms such as butadiene, isoprene, 2-isopropyl-1,3-butadiene, chloroprene, and the like; (c) vinyl and allyl esters such as vinyl acetate, vinyl propionate, allyl acetate, and the like; (d) vinyl and allyl ethers such as vinyl methyl ether, allyl methyl ether, and the like; and (e) arylates of the formula

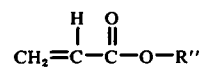

wherein R" is an alkyl radical containing 1 to about 18 carbon atoms or an alkoxyalkyl, and alkylthioalkyl, or cyanoalkyl radical, each containing 2 to about 12 carbon atoms. Examples of such acrylates are ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, and the like. Often two or more types of these polymerized monomeric units are contained in the polymeric backbone.

The vinylidene monomers listed above are readily polymerized in major amounts with up to 50% by weight (of the total weight of the polymer) of (f) vinyl aromatics such as styrene, α-methyl styrene, vinyl toluene, and the like; (g) vinyl nitriles such as acrylonitrile, methacrylonitrile, and the like; (h) methacrylates and ethacrylates such as methyl methacrylate, ethyl methacrylate, octyl methacrylate, ethyl ethacrylate, and the like; and (i) divinyls and diacrylates such as divinyl benzene, divinyl ether, diethylene glycol diacrylate, and the like. Liquid polymer compositions containing liquid carboxyl-containing polymers comprised of over 50% to 100% by weight of interpolymerized units of a vinylidene monomer(s) listed in (a) to (e) with up to 50% by weight of interpolymerized units of a vinylidene monomer(s) listed in (f) to (i), are within the scope of this invention.

Examples of liquid carboxyl-terminated polymers are carboxyl-terminated polyethylene, carboxyl-terminated polyisobutylene, carboxyl-terminated polybutadiene, carboxyl-terminated polyisoprene, carboxyl-terminated poly(butadiene-acrylonitrile), carboxyl-terminated poly(butadiene-styrene), carboxyl-terminated poly(ethyl acrylate), carboxyl-terminated poly(ethyl acrylate-n-butyl acrylate), carboxyl-terminated poly(n-butyl acrylate-acrylonitrile), carboxyl-terminated poly(butyl acrylate-styrene), and the like. These polymers can be prepared by free-radical polymerization using carboxyl-containing initiators and/or modifiers as disclosed in U.S. Pat. No. 3,285,949 and German Patent No. 1,150,205, and by solution polymerization using lithium metal or organometallic compounds and post-treating the polymers to form carboxyl groups as disclosed in U.S. Pat. Nos. 3,135,716 and 3,431,235.

The polymers can also be prepared by reacting liquid polymers having other than terminal carboxyl groups with compounds so as to yield carboxyl groups. For example, carboxyl-terminated polymers can be prepared from hydroxyl-terminated polymers by reaction with dicarboxyl compounds. Mercaptan- and amine- or amide-terminated polymers can be reacted with unsaturated carboxylic acids or anhydrides to yield carboxyl-terminated polymers. Halogen-terminated polymers can be reacted with unsaturated anhydrides in the presence of Lewis acids to yield carboxyl groups. Hence, it is seen that the method of preparing the liquid carboxyl-terminal polymer is not critical to the invention, as long as the polymer has at least terminal carboxyl groups and a polymeric backbone consisting of carbon-carbon or carbon-oxygen linkages.

Carboxyl-terminated poly(butadiene-acrylonitrile) and carboxyl-terminated poly(butadiene-styrene) polymers were found to be especially useful. These polymers contain about 5% to about 40% by weight of acrylonitrile or styrene, about 0.5% to about 10% by weight of carboxyl, and about 50% to about 95% by weight of butadiene based upon the weight of the polymer.

The dihydric compound used in the liquid polymer composition is a dihydric aromatic compound. Examples of dihydric aromatic compounds are catechol, resorcinol, hydroxybenzyl alcohols, bis benzylic alcohol, dihydroxynaphthalenes, and the like, and bisphenols of the formula

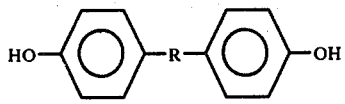

where R is an alkylene group containing 1 to 12 carbon atoms or a bivalent radical containing 1 to 8 atoms of C, O, S, and/or N. Examples of the bisphenols are methylene bisphenol, butylidene bisphenol, octalidene bisphenol, isopropylidene bisphenol, bisphenol sulfide, bisphenol sulfone, bisphenol ether, bisphenol amine, and the like.

The amine employed in the liquid polymer compositions has selectively for the carboxyl-epoxide reaction. This means that the amine acts first and primarily to react the epoxy resin with the carboxyl-terminated polymer resulting in chain extension, and then subsequently to crosslink the chains. It is postulated that this occurs by the amine reacting first with the carboxyl group to yield an amine-acid salt. The salt then reacts with an epoxide group to chain extend the molecules. Epoxide-epoxide reactions and epoxide-hydroxyl reactions are subsequent to the amine-acid and epoxide reaction. This function of the amine, to react with the carboxyl group first, is believed necessary to develop the unique two-phase system of the vulcanizate. The amine used should also have good reactivity, i.e. produce a strong, fast cure.

The amines used can be primary, secondary, and tertiary aliphatic and aliphatic heterocyclic amines, and the sals and adducts of these amines. Amines encompassed within the definition above are disclosed in *Handbook of Epoxy Resins*, Lee and Neville, McGraw-Hill Book Co., N.Y. (1967), Chapters 7 and 9.

Types of amines useful to prepare the novel vulcanizates are aliphatic amines and aliphatic heterocyclic amines and salts and adducts thereof. Examples of the aliphatic amines are triethylamine, triisopropylamine, dimethylethanol amine, ethylenediamine, butylenediamine, α-methylbutylenediamine, 1,6-hexamethylenediamine, diethylenetriamine, triethylenetetraamine, dimethylaminopropylamine, diethylaminopropylamine, β-hydroxyethylamine, aminoethanolamine, m-xylylenediamine, N-benzyl-N,N-dimethylamine, 2,4,6-tris(N,N-dimethylaminomethyl)phenol, and the like. Examples of aliphatic heterocyclic amines are morpholine, piperidine, piperazine, N-methylpiperidine, N-methylpiperazine, N,N'-dimethylpiperazine, N,-(2-aminoethyl)piperazine, N,N'-bis-(3-aminopropyl)piperazine, and the like. Salts of these amines such as amine-acid salts like triethylenediamine/dibenzoic acid salt, N-methylpiperidine/HCl salt, diethylamine/HCl salt, and tri-2-ethylhexanoate salt of 2,4,6-tris(dimethylaminoethyl)phenol are useful. Adducts of amines that release amines upon heating like N-(2-hydroxypropyl)ethylenediamine, N-(hydroxypropyl)-1,2-diaminopropane, and N,N'-bis(hydroxyethyl)triethylenetetraamine are also useful.

Excellent results have been obtained using 2,4,6-tris(dimethylaminomethyl)phenol and its 2-ethylhexanoate salt, piperadine, piperazine, and N-(2-aminoethyl)piperazine as the amine curing agent.

The epoxy resin, the liquid polymer, the dihydric compound, and the amine are admixed and heated to a temperature of from about 80° C. to about 180° C. to cure the mixture. It is believed that cure in the given range is effectual to produce the desired particle size range in the two-phase vulcanizate.

The liquid polymer vulcanizate is an elastomeric solid having (at ambient temperature) at tensile strength of over 1000 pounds per square inch (psi) and an elongation of at least about 140 percent. These properties are obtained without the need of reinforcing fillers such as carbon blacks, silicates, carbonates, and the like. The vulcanizates also have low Gehman Freeze point values; i.e. values typical of the liquid polymer. When liquid poly(butadiene-acrylonitrile) rubbers are used, Gehman Freeze points of under −20° C. and often of −40° C. and below are obtained. Durometer A hardness is from about 50 to 100 or more.

The vulcanizate can be characterized as a solid having two phases, a continuous rubbery phase and a particulate hard phase. The size of the particles making up the particulate phase ranges from about 100 A to about 5μ in diameter. The particles can vary in diameter according to a normal distribution curve, or can have size ranges following a bimodal distribution curve or of even a more multi-peaked distribution curve. Generally, a small particle size yields a vulcanizate having high modulus and hardness, while a large particle size yields a vulcanizate having lower modulus and hardness.

The particulate phase consists essentially of a major amount of an epoxy resin, a minor amount of a dihydric compound, a small amount of a liquid polymer, and a small amount of an amine. The particulate phase is hard and has a high Gehman freeze point value. The continuous phase is an elastomer having a Gehman Freeze point value typical of the liquid polymer employed. The continuous phase comprises a major amount of a liquid polymer, a minor amount of an epoxy resin, a small amount of a dihydric compound, and a small amount of amine. The particulate and continuous phases are chemically bonded to each other.

In addition to the essential four components, i.e. the epoxy resin, the liquid polymer, the dihydric compound, and the amine, the liquid polymer composition and the cured vulcanizate thereof can contain a broad range of compounding ingredients. These ingredients are typical ingredients used in rubber and/or epoxy compounding. Standard levels of these ingredients are employed, such levels being well known in the art. The only limitation placed on the levels of compounding ingredients used is that the liquid polymer composition containing these ingredients must be flowable, i.e. castable at temperatures ranging from about 20° C. to about 100° C. This limits the amount of reinforcing fillers and other ingredients which thicken the liquid composition to low levels of up to about 20 parts by weight based upon the weight of the liquid polymer composition.

Examples of compounding ingredients are reinforcing fillers such as carbon blacks, metal carbonates and silicates, and glass, asbestos, and textile fibers; colorants such as metal oxides and metal sulfides, and organic colorants; lubricants and plasticizers such as petroleum oils, castor oil, glycerin, silicones, aromatic and paraffinic oils, and the like; and alkyl and aromatic phthalates, sebacates, trimellitates, and the like; and antioxidants and stabilizers such as phenyl-$\beta$-naphthylamine, 2,6-di-t-butyl paracresol, 2,2'-methylenebis(4-ethyl-6-t-butyl phenol), 2,2'-thiobis-(4-methyl-6-t-butyl phenol), 4,4'-butylidenebis-(6-t-butyl-m-cresol), tris-(3,5-di-t-butyl-4-hydroxybenzyl)isocyanurate, hexahydro-1,3,5-tris-$\beta$-(3,5-di-tert-butyl-4-hydroxyphenyl)propionyl triazine, tetrakis-methylene-3(3',5'-di-t-butyl-4'-hydroxyphenyl)-propionate methane distearyl thiodipropionate, tri-(nonylated phenyl)phosphite, and the like.

The liquid polymer, epoxy resin, dihydric compound, and amine and compounding ingredients (if used) are admixed using mixing kettles, Henschel mixers, ink mills, Banbury mixers, and the like, employing standard mixing procedures and techniques. Heating of the composition may be helpful to obtain dissolution and uniform dispersion of the materials. The mixture is casted, i.e. poured or injected into stationary molds, rotational molds, and the like, and heated at about 110° C. to about 180° C. The compositions of the invention can be readily used to make molded products using rotational casting techniques. The ability of the liquid polymer composition to be readily castable and, upon cure, to yield an elastomeric reinforced vulcanizate, is unique. Prior to this invention, reinforced liquid polymer compositions were not castable, or, if they were castable, only low tensile strength, soft vulcanizates, or high tensile strength, low elongation vulcanizates were obtainable.

Applications for the novel liquid polymer compositions of this invention are castable gaskets, castable seals and o-rings, molded auto parts and hosing, flowable coatings for belting and metals, flowable adhesives, encapsulation of electrical components, casted gears and machine parts, and general molded products for industrial and home use.

The following examples serve to more fully illustrate the invention. Ingredients are given in parts by weight unless otherwise indicated.

EXAMPLES

General Mixing Procedure

The novel vulcanizates are prepared following a general mixing procedure. The materials, except for the amine, are placed into a mixing kettle (if compounding ingredients are used, these are normally mixed in with the other materials as a batch). A vacuum stirrer is employed to remove entrapped air. This greatly reduces bubbling and produces an improved, bubble-free product (tensile sheet). Temperature of mixing is from about 60° C. up to about 95° C. The materials are mixed until they are uniform, about 20 to 30 minutes. The amine is then added to the uniform mixture at mix temperature or below (usually about 60° C.). The whole composition is then vacuum stirred for about 3 to 5 minutes, and then poured into a tensile sheet mold (or other appropriate mold). The viscosity of the vulcanizable mixture at this point is below 10,000 centipoises and it is flowable and readily castable in molds. The filled mold is then placed in an air oven for the designated time at a set temperature. The mold assembly is removed, cooled down, and the vulcanizate removed for use or testing.

Materials

The epoxy resins, dihydric compounds, and amines described herein are all known materials, and most are inexpensive and readily available commercial materials.

The liquid carboxyl-terminated polymers described herein are known. The materials are either available or can be readily prepared following the procedures described in U.S. Pat. Nos. 3,285,949, 3,135,716, and 3,431,235. The liquid polymers employed in the examples are commercially available products, or they were prepared following the process described in U.S. Pat. No. 3,285,949.

All other materials described herein and used in the examples are commercially available products.

EXAMPLE I

A liquid carboxyl-terminated polymer was mixed with an epoxy resin and a dihydric compound at various weight ratios of polymer to epoxy, and the mix cured using an amine. The materials used were as follows: a carboxyl-terminated poly(butadiene-acrylonitrile) rubber, identified as CTBN, having an acrylonitrile content of 17.1% by weight (measured using the Kjehldahl method for nitrogen determination) and a carboxyl content of 2.44% by weight, both weights based upon the total weights of the polymer, and having a bulk viscosity of 27° C. of 106,000 centipoise and a molecular weight of about 3400 (measured using a Mechrolab Vapor Pressure Osmometer); an epoxy resin, identified as Epon 828, which is a bisphenol A/epichlorohydrin type resin having two terminal epoxide groups, an epoxide equivalent weight of about 185, and a bulk viscosity at 25° C. of abou 12,000 centipoises; the dihydric compound being p,p'-isopropylidene bisphenol, identified as BPA; and the amine being the tris(hexanoic acid salt) of tri(dimethylaminomethyl)phenol, identified as Cure Agent D or C.A.D.

The materials were admixed following the general mixing procedure. The recipes and properties of the vulcanizates are as follows:

|  | 1 | 2 | 3 | 4 |
|---|---|---|---|---|
| CTBN | 107 | 124 | 143 | 165 |
| Epon 828 | 100 | 100 | 100 | 100 |
| BPA | 24 | 24 | 24 | 24 |
| C.A.D. | 7.5 | 7.5 | 7.5 | 7.5 |
| Cured - |  |  |  |  |
| Time, hours | 16 | 16 | 16 | 16 |

-continued

|  | 1 | 2 | 3 | 4 |
|---|---|---|---|---|
| Temperature, °C. | 120 | 120 | 120 | 120 |
| Tensile, psi | 2290 | 1560 | 2130 | 1890 |
| Elongation, percent | 150 | 270 | 220 | 240 |
| Hardness, Durometer A | 86 | 79 | 75 | 69 |
| Compression set, percent | 35 | 62 | 44 | 43 |
| Gehman freeze, °C. | −45 | −43 | −46 | −42 |
| Oil Swell, No. 3 Oil, percent | 38 | 41 | 44 | 46 |

The data shows that the vulcanizates have good elastomeric properties, especially tensile strength and elongation. The properties are comparable to those obtained from a solid high molecular weight poly(butadiene-acrylonitrile) polymer. For example, an NBR rubber having a Mooney (ML-4 at 212° F.) viscosity of 50, and an acrylonitrile content of about 20% by weight was admixed at 100 1 parts of polymer, 40 parts of N-550 carbon black, 5 parts of zinc oxide, 1.0 part of stearic acid, and 3.5 parts of tetramethyl thiuram disulfide. The mix was cured at 310° F. for 30 minutes, and then tested. Properties obtained were: 2500 psi tensile, 410% elongation, 63 hardness (Duro A), and a −41° C. Gehman freeze point. This example demonstrates that the liquid polymer vulcanzates of this invention have properties comparable to solid polymer vulcanizates. Yet, unlike the solid polymer composition, the liquid polymer compositions are flowable and castable prior to cure. The four compositions above were easily poured into tensile sheet molds, viscosity of the mixes being about 2000 centipoises at about 80° C. Note, particularly, the low Gehman freeze point values of the vulcanizates even though high levels of epoxy resin were used.

EXAMPLE II

Liquid polymer compositions were prepared wherein the liquid carboxyl-terminated poly(butadiene-acrylonitrile) rubber used has varying carboxyl and acrylonitrile content. The polymers used in this example (and elsewhere in other examples) are described as follows:

|  | Percent Carboxyl | Percent Acrylonitrile | Bulk Viscosity Centipoise at 27° C. |
|---|---|---|---|
| CTBN-1 | 2.44 | 17.1 | 106,000 |
| CTBN-2 | 2.44 | 17.4 | 136,000 |
| CTBN-3 | 2.61 | 17.8 | 117,000 |
| CTBN-4 | 2.61 | 26.2 | 544,000 |

Recipes used and data obtained are as follows:

|  | 1 | 2 | 3 | 4 |
|---|---|---|---|---|
| CTBN-1 | 124 | — | 165 | — |
| CTBN-4 | — | 124 | — | 165 |
| Epon 828 | 100 | 100 | 100 | 100 |
| BPA | 24 | 24 | 24 | 24 |
| C.A.D. | 7.5 | 7.5 | 7.5 | 7.5 |
| Cured - Time, hours | 16 | 16 | 1 | 1 |
| Temperature, °C. | 120 | 120 | 130 | 130 |
| Tensile, psi | 2140 | 1970 | 1780 | 1980 |
| Elongation, % | 200 | 170 | 300 | 300 |
| Compression Set, % | 41 | 41 | 101 | 95 |
| Gehman Freeze, °C. | — | — | −48 | −23 |
| Oil Swell, No. 3 Oil, % | 41 | 18 | — | — |

The data shows that the tensile and elongation properties of the vulcanizates are not severly affected by a change in the carboxyl and/or acrylonitrile content of the liquid carboxyl-terminated polymer. Of course, the Gehman freeze value is affected, along with the No. 3 oil swell, as both are responsive to the acrylonitrile content of the liquid polymer. The Gehman freeze values and the No. 3 oil swell results are in accordance with the structure of the vulcanizate, i.e. a continuous elastomeric polymer phase having good low temperature properties and good oil swell resistance, and a dispersed hard epoxy-rich phase. The example demonstrates the ease and convenience of preparing a casted vulcanizate having good oil swell resistance, low temperature flexibility, and good tensile and elongation.

EXAMPLE III

This example demonstrates the effect of the liquid polymer/epoxy resin weight ratio on properties. The recipes and data are as follows:

|  | 1 | 2 | 3 | 4 | 5 |
|---|---|---|---|---|---|
| CTBN-2 | 384 | 224 | — | — | — |
| CTBN-4 | — | — | 345 | 224 | 165 |
| Epon 828 | 100 | 100 | 100 | 100 | 100 |
| BPA | 24 | 24 | 24 | 24 | 24 |
| C.A.D. | 7.5 | 7.5 | 7.5 | 7.5 | 7.5 |
| Cured - Time, hours | 2 | 2 | 2 | 2 | 2 |
| Temperature, °C. | 130 | 130 | 130 | 130 | 130 |
| Tensile, psi | 790 | 1560 | 800 | 1350 | 1930 |
| Elongation, % | 640 | 400 | 670 | 420 | 410 |

The data shows that at levels of liquid carboxyl-terminated polymer to epoxy resin of over about 300 parts to 100 parts by weight, the vulcanizate does not exhibit the good tensile properties provided by the liquid polymer compositions within the scope of this invention (Samples 2, 4 and 5).

EXAMPLE IV

Following Example III, further liquid polymer compositions were prepared at various weight ratios of carboxyl-terminated polymer to epoxy resin, and cured using different amines. The recipes and data obtained are given below.

|  | 1 | 2 | 3 | 4 | 5 | 6 | 7 | 8 | 9 | 10 | 11 |
|---|---|---|---|---|---|---|---|---|---|---|---|
| CTBN-1 | 124 | 143 | 165 | 143 | 165 | — | — | — | — | — | — |
| CTBN-2 | — | — | — | — | — | — | — | 143 | 165 | — | — |
| CTBN-4 | — | — | — | — | — | 143 | 165 | — | — | 143 | 165 |
| Epon 828 | 100 | 100 | 100 | 100 | 100 | 100 | 100 | 100 | 100 | 100 | 100 |
| BPA | 24 | 24 | 24 | 24 | 24 | 24 | 24 | 24 | 24 | 24 | 24 |
| DMP-30[a] | 7.5 | 7.5 | 7.5 | — | — | — | — | — | — | — | — |
| Piperidine | — | — | — | 7.5 | 7.5 | 7.5 | 7.5 | — | — | — | — |
| AEP[b] | — | — | — | — | — | — | — | 7.5 | 7.5 | 7.5 | 7.5 |
| Cured Time, Hours | 16 | 16 | 16 | 16 | 16 | 16 | 16 | 3 | 3 | 3 | 3 |
| Temperature, °C. | 120 | 120 | 120 | 120 | 120 | 120 | 120 | 120 | 120 | 120 | 120 |
| Tensile, psi | 2760 | 2290 | 2120 | 2000 | 1840 | 1690 | 1140 | 2210 | 2180 | 2580 | 2110 |
| Elongation, % | 145 | 170 | 170 | 400 | 470 | 330 | 390 | 160 | 200 | 200 | 210 |

-continued

|  | 1 | 2 | 3 | 4 | 5 | 6 | 7 | 8 | 9 | 10 | 11 |
|---|---|---|---|---|---|---|---|---|---|---|---|
| Hardness, Duro. A | 86 | 85 | 80 | — | — | — | — | 95 | 94 | 93 | 94 |
| Compression Set, % | 50 | 60 | 52 | 90 | 95 | 90 | 100 | 80 | 82 | 88 | 84 |
| Gehman Freeze, ° C. | −45 | −45 | −47 | — | — | — | — | −54 | −54 | −42 | −46 |
| Volume Swell, No. 3 Oil, % | 38 | 41 | 43 | 47 | 50 | 19 | 20 | — | — | — | — |

[a]tri(dimethylaminomethyl)phenol
[b]aminoethylpiperazine

This example demonstrates the utility of different amines to prepare the novel vulcanizates. In every sample, good vulcanizate properties were obtained. Generally, as the weight ratio of polymer to epoxy increased, tensile and hardness decreased and elongation increased. A similar pattern is observed in the data of Example I where C.A.D. was used as the amine.

Combinations of two or more amines can be used. For example, CTBN-3 and CTBN-4 were separately admixed at 165 parts by weight with 100 parts of Epon 828, 24 parts of BPA, and 3.75 parts each of C.A.D. and DMP-30. Agerite D was added at 1.0 part. After cure for one hour at 130° C., the tensile and elongation were 1780 psi and 190 percent, and 1920 psi and 220 percent, respectively.

EXAMPLE V

Using DMP-30 as the amine catalyst, liquid polymer compositions were prepared employing carboxyl-terminated polymers of varying acrylonitrile content. The recipes and property data are:

|  | 1 | 2 | 3 | 4 | 5 |
|---|---|---|---|---|---|
| CTBN-1 | 165 | — | — | — | — |
| CTBN-2 | — | 224 | — | — | — |
| CTBN-4 | — | — | 124 | 165 | 224 |
| Epon 828 | 100 | 100 | 100 | 100 | 100 |
| BPA | 24 | 24 | 24 | 24 | 24 |
| DMP-30 | 7.5 | 7.5 | 7.5 | 7.5 | 7.5 |
| Cured Time, hours | 0.5 | 2 | 16 | 0.5 | 2 |
| Temperature, ° C. | 140 | 130 | 120 | 140 | 130 |
| Tensile, psi | 2080 | 510 | 2650 | 2420 | 1730 |
| Elongation, percent | 170 | 250 | 140 | 210 | 300 |
| Gehman Freeze, ° C. | — | −47 | — | — | −26 |
| Volume Swell, No. 3 Oil, % | — | — | 18 | — | — |
| Compression Set, % | 73 | 80 | 53 | 75 | 105 |

A trend toward higher tensiles is observed when a higher acrylonitrile content liquid polymer is used. Of course, the use of higher acrylonitrile content polymers yielded lower No. 3 oil swells and higher Gehman Freeze points. The data shows that higher tensiles and lower elongations and compression sets are obtained at lower polymer to epoxy weight ratios.

As a comparison, liquid polymer CTBN-1 was mixed at 100 parts by weight with 30 parts by weight of N-550 carbon black, 10 parts by weight of Epon 828, and 0.6 part by weight of DMP-30. This system corresponds to a composition disclosed in a published article by Drake, et al, Rubber World, October, 1968. The system was not fluid and resembled a putty in consistency. It could not be casted. The system was spread onto a tensile sheet mold and cured 16 hours at 105° C. Tensile strength was 1550 psi and elongation was 400 percent.

EXAMPLE VI

When Example V was repeated using piperidine and AEP as the amines, similar results were obtained. Using piperidine, as the only curing agent, as the polymer/epoxy weight ratio increased from 124 to 165/100, tensile strengths ranged from 2160 psi to 1140 psi. Using AEP as the only curing agent, as the polymer/epoxy weight ratio increased from 124 to 224/100, tensile strengths ranged from 2480 psi to 150 psi.

EXAMPLE VII

Time and temperature of cure is a factor in the development of optimum properties of the vulcanizates. Generally, high temperatures (above 180° C.) are not favorable for obtaining optimum tensile and elongation. The following series of cures demonstrates the effects of time and temperature of cure on the development of optimum properties.

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CTBN-5[a] | — | — | — | — | — | — | — | — | — | — | — | — | 143 | 143 |
| CTBN-1 | 143 | 143 | 143 | — | — | — | — | — | — | — | — | — | — | — |
| CTBN-3 | — | — | — | 143 | 143 | 143 | 143 | 143 | 143 | 143 | 143 | 143 | — | — |
| Epon 828 | 100 | 100 | 100 | 100 | 100 | 100 | 100 | 100 | 100 | 100 | 100 | 100 | 100 | 100 |
| BPA | 24 | 24 | 24 | 24 | 24 | 24 | 24 | 24 | 24 | 24 | 24 | 24 | 24 | 24 |
| C.A.D. | 7.5 | 7.5 | 7.5 | — | — | — | 7.5 | 7.5 | 7.5 | 7.5 | 7.5 | 7.5 | 7.5 | — |
| DMP-30 | — | — | — | 7.5 | 7.5 | 7.5 | — | — | — | — | — | — | — | 7.5 |
| Cured Time, hours | 1 | 1 | 1 | 1 | 2 | 4 | 0.5 | 1.0 | 1.5 | 0.5 | 1.0 | 1.5 | 1.0 | 1.0 |
| Temperature, ° C. | 130 | 140 | 150 | 130 | 130 | 130 | 140 | 140 | 140 | 150 | 150 | 150 | 180 | 180 |
| Tensile, psi | 1720 | 1680 | 1490 | 2230 | 2030 | 1770 | 1340 | 1670 | 1910 | 1260 | 1250 | 1020 | 1060 | 1340 |
| Elongation, % | 260 | 270 | 320 | 150 | 160 | 140 | 280 | 270 | 270 | 320 | 290 | 230 | 310 | 160 |
| Compression Set, % | 101 | 99 | 98 | 70 | 69 | 66 | 106 | 94 | 88 | 103 | 104 | 97 | — | 76 |

[a]Polymer contains 17.9% acrylonitrile content and 2.29% carboxyl content, and has a 110,000 cps viscosity at 27° C.

EXAMPLE VIII

Many rubber compounding ingredients can be added to the liquid polymer compositions. This example demonstrates the use of standard fillers, plasticizers, and antioxidants. As mentioned previously, fillers and pigments such as carbon black and titanium dioxide can be used in low levels and the compositions will still be flowable and castable.

|  | 1 | 2 | 3 | 4 | 5 | 6 |
|---|---|---|---|---|---|---|
| CTBN-1 | 143 | — | — | — | — | — |
| CTBN-4 | — | 165 | 165 | 165 | 165 | 165 |
| Epon 828 | 100 | 100 | 100 | 100 | 100 | 100 |
| BPA | 24 | 24 | 24 | 24 | 24 | 24 |

-continued

|  | 1 | 2 | 3 | 4 | 5 | 6 |
|---|---|---|---|---|---|---|
| DMP-30 | 7.5 | — | — | — | — | — |
| C.A.D. | — | 7.5 | 7.5 | 7.5 | 7.5 | 7.5 |
| N-907 Carbon Black | — | — | — | 10 | 10 | 10 |
| TiO$_2$ | — | — | 10 | — | — | — |
| Agerite D[a] | — | — | 1.06 | 1.0 | 1.0 | 1.0 |
| DOP[b] | 10 | — | — | — | — | — |
| Cured |  |  |  |  |  |  |
| Time, hours | 16 | 1 | 1 | 1 | 1 | 1.5 |
| Temperature, °C. | 120 | 130 | 130 | 130 | 150 | 140 |
| Tensile, psi | 2310 | 1980 | 1540 | 1300 | 1260 | 1510 |
| Elongation, percent | 140 | 300 | 290 | 280 | 300 | 290 |
| Compression Set, percent | 62 | 95 | 100 | 98 | 90 | 91 |
| Gehman Freeze, °C. | — | −23 | −24 | −27 | −25 | — |

[a]Polymerized 1,2-dihydro-2,2,4-trimethylquinoline
[b]Dioctyl phthalate

EXAMPLE IX

Many different liquid carboxyl-terminated polymers can be used to prepare the novel vulcanizates. Listed below are some of the liquid polymers that were evaluated.

| Polymer | Wt. % Carboxyl Content | Polymeric Backbone | Bulk Visc. Centipoises at 27° C. |
|---|---|---|---|
| CTB-1 | 2.12 | Butadiene | 33,000 |
| CTB-2 | 1.98 | Butadiene | 38,000 |
| HC-434 | 2.48 | Butadiene | — |
| CTBS-1 | 2.43 | 90 Butadiene/ 10 Styrene | 36,700 |
| CTBS-2 | 1.99 | 70 Butadiene/ 30 Styrene | — |
| CTBNX | 3.20 | Butadiene/ Acrylonitrile 17% | 120,000 |
| CTBNXX | 3.28 | Butadiene/ Acrylonitrile 17% | — |
| PBAN[a] | about 2.5 | Butadiene/ Acrylonitrile/ Acrylic Acid | — |
| BD/VCN[b] | none | 73 Butadiene/27 Acrylonitrile | 20,000 (at 50° C.) |

[a]Only pendant carboxyl groups, no terminal carboxyl groups.
[b]Contains no carboxy groups.

Using C.A.D. as the amine catalyst, the following series of liquid polymer compositions was prepared and cured for 1.5 hours at 140° C.

|  | 1 | 2 | 3 | 4 | 5 | 6 | 7 |
|---|---|---|---|---|---|---|---|
| CTB-2 | 143 | 165 | — | — | — | — | — |
| HC-434 | — | — | 165 | — | — | — | — |
| CTBS-1 | — | — | — | 143 | 165 | — | — |
| CTBS-2 | — | — | — | — | — | 143 | 165 |
| Epon 828 | 100 | 100 | 100 | 100 | 100 | 100 | 100 |
| BPA | 24 | 24 | 24 | 24 | 24 | 24 | 24 |
| C.A.D. | 7.5 | 7.5 | 7.5 | 7.5 | 7.5 | 7.5 | 7.5 |
| Tensile, psi | 1990 | 1830 | 1770 | 2030 | 2060 | 1850 | 1610 |
| Elongation, percent | 170 | 190 | 180 | 180 | 200 | 210 | 210 |
| Hardness, Duro A | 79 | 76 | 74 | 83 | 83 | — | — |
| Compression Set, % | 67 | 68 | 82 | 73 | 71 | — | 89 |

The example demonstrates the use of a number of liquid carboxyl-terminated polymers having various polymeric backbones and/or carboxyl contents. This data complements the prior data which showed the utility of poly(butadieneacrylonitrile) polymers having various acrylonitrile contents.

Following the procedure given above, a second series of liquid polymers was evaluated. The amine used as the curing agent was piperidine. The recipes and data are:

|  | 8 | 9 | 10 | 11 | 12 | 13 | 14 |
|---|---|---|---|---|---|---|---|
| CTB-1 | 165 | — | — | — | — | — | — |
| CTBS-1 | — | 124 | 165 | — | — | — | — |
| PBAN | — | — | — | 124 | — | — | — |
| BD/VCN | — | — | — | — | — | — | 124 |
| CTBNX | — | — | — | — | 124 | — | — |
| CTBNXX | — | — | — | — | — | 124 | — |
| Epon 828 | 100 | 100 | 100 | 100 | 100 | 100 | 100 |
| BPA | 24 | 24 | 24 | 24 | 24 | 24 | 24 |
| Piperidine | 7.5 | 7.5 | 7.5 | 7.5 | 7.5 | 7.5 | 7.5 |
| Cured |  |  |  |  |  |  |  |
| Time, hrs. | 1 | 16 | 1 | 16 | 16 | 16 | 16 |
| Temperature, °C. | 130 | 120 | 130 | 120 | 120 | 120 | 120 |
| Tensile, psi | 1870 | 2790 | 1650 | 300 | 2040 | 1800 | did |
| Elongation, % | 270 | 190 | 280 | 110 | 190 | 150 | not |
| Hardness, Duro A | — | — | 78 | — | — | 76 | cure |
| Compression Set % | 105 | 63 | 103 | 41 | 76 | 78 |  |
| Gehman Freeze, °C. | −75 | — | −68 | −53 | −40 | −35 |  |

The data shows that not all liquid polymers are useful to prepare the novel vulcanizates. Note that Sample 11 yielded a very weak vulcanizate. The liquid polymer employed in Sample 11 has to terminal carboxyl groups, i.e. the only carboxyl groups present were random and pendant to the polymeric backbone. Samples 12 and 13 also employed liquid polymers containing pendant carboxyl groups, but these polymers also have the necessary terminal carboxyl groups. Sample 14, containing a liquid polymer having no carboxyl groups, did not cure.

A third series of liquid polymer compositions was prepared and evaluated. The amine used was AEP. The data is as follows:

|  | 15 | 16 | 17 | 18 |
|---|---|---|---|---|
| CTB-2 | 165 | 192 | 224 | — |
| CTBS-1 | — | — | — | 224 |
| Epon 828 | 100 | 100 | 100 | 100 |
| BPA | 24 | 24 | 24 | 24 |
| AEP | 7.5 | 7.5 | 7.5 | 7.5 |
| Cured 2 hrs. at 130° C. |  |  |  |  |
| Tensile, psi | 1940 | 1700 | 1720 | 1380 |
| Elongation, % | 160 | 170 | 200 | 170 |
| Compression Set, % | 80 | 87 | 68 | 78 |

EXAMPLE X

CTBN-3 was mixed at 143 parts by weight with 100 parts of Epon 828 and 24 parts of BPA, and cured using 3.75 parts of DMP-30. The vulcanizate had a 2010 psi tensile, 140 percent elongation, 85 Duro A hardness, and an 88 percent compression set.

EXAMPLE XI

Although many amines are useful to prepare the novel vulcanizates, the use of different types of the specified amines yields vulcantizates of varying modulus. Thus, a manufacturer can select his amine to give a high or low modulus vulcanizate. The following recipes were made and evaluated:

| CTBN-1 | 124 | 124 |
|---|---|---|
| Epon 828 | 100 | 100 |
| BPA | 24 | 24 |
| C.A.D. | — | 7.5 |
| Piperidine | 7.5 | — |
| Cured |  |  |
| Time, hours | 16 | 16 |
| Temperature, °C. | 120 | 120 |
| 100% Modulus, psig | 470 | 810 |

-continued

| | | |
|---|---|---|
| Tensile, psig | 2160 | 2140 |
| Elongation, % | 270 | 200 |

As the data shows, the use of C.A.D. as the amine yields a vulcanizate of much higher modulus than if piperidine is used. The use of DMP-30 and AEP as the amines results in a still higher modulus vulcanizate than that obtained using C.A.D.

EXAMPLE XII

Vulcanizates were prepared from compositions suggested in the art. The compositions were handled and cured exactly as the compositions of the present invention. DEN 438 is a triepoxy novolac resin having an epoxide equivalent weight of 176–181. The recipes and data obtained follow.

| | 1 | 2 | 3 | 4 |
|---|---|---|---|---|
| Epon 828 | 91 | 100 | 100 | 100 |
| DEN 438 | 9 | — | — | — |
| CTBN-1 | — | — | 100 | 100 |
| CTBN-5 | 54 | 35 | — | — |
| BPA | 20 | 18 | — | — |
| Monuron[a] | 5 | — | — | — |
| Piperidine | — | 7 | — | — |
| C.A.D. | — | — | 6 | — |
| DMP-30 | — | — | — | 6 |
| Cure | | | | |
| Time, hrs. | 4 | 4 | 16 | 16 |
| Temperature, ° C. | 130 | 130 | 120 | 120 |
| Tensile, psig | 1300 | —[b] | 2640 | 3160 |
| Elongaion, % | 50 | —[b] | 100 | 80 |

[a]3-p-chlorophenyl-1,1-dimethyl urea
[b]stiff, cheesy material; could not prepare proper tensile samples Sample 1 is a recipe suggested in U.S. Pat. No. 3,655,818. Although satisfactory tensile is obtained, the elongation is quite low and an elastomeric vulcanizate is not obtained. Sample 2, suggested in U.S. Pat. No. 3,678,130 is even less rubbery in nature. Samples 3 and 4 demonstrate that at a 50/50 weight ratio of epoxy to liquid polymer, unless a dihydric material is employed, only low elongations are obtained.

Further test were run to demonstrate that the use of an epoxy resin having more than about two epoxide groups per molecule (i.e., triepoxy resins and higher enumerated epoxy resins) does not yield the elastomeric vulcanizates of the invention.

The compositions were mixed according to the following recipes (in parts by weight).

| | 1 | 2 | 3 | 4 | 5 |
|---|---|---|---|---|---|
| CTBN[a] | 124 | 124 | 124 | 124 | 124 |
| Epon 828[b] | 100 | 100 | — | — | — |
| ERLB-0500[c] | — | — | 100 | 67 | 67 |
| BPA | 24 | 24 | 24 | — | — |
| C.A.D. | 7.5 | — | 7.5 | 7.5 | — |
| Piperidine | — | 7.5 | — | — | 7.5 |
| Cured 16 hours at 120° C. | | | | | |
| Tensile, psi | 2300 | 2510 | 1500 | 760 | 690 |
| Elongation, percent | 210 | 250 | 50 | 290 | 530 |

[a]Liquid carboxyl-terminated butadiene-acrylonitrile polymer having a carboxyl content of about 2.3 percent by weight and an acrylonitrile content of about 18 percent by weight.
[b]Bisphenol A/epichlorohydrin type resin having two epoxy groups per molecule and an epoxide equivalent weight of about 185.
[c]A triepoxy resin having three epoxy groups per molecule, of the formula

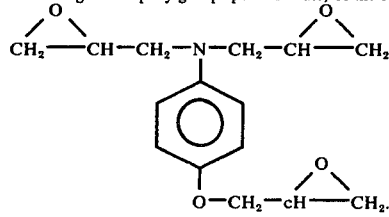

Samples 1 and 2 are liquid polymer compositions within the scope of the invention. Vulcanizates obtained from samples 1 and 2 exhibit excellent elastomeric properties. Sample 3 was prepared using a triepoxy resin in direct replacement of the diepoxy resin of the invention. A low elongation vulcanizate was obtained which is believed to be the result of over-crosslinking. Samples 3 and 4 are attempts to lower the triepoxy resin content to avoid possible over-crosslinking. No BPA was used in these samples. The example demonstrates that each of the defined ingredients in the compositions is selected to yield the desired properties in the cured vulcanizate.

I claim:
1. A cured elastomeric vulcanizate comprising (A) a resinous particulate phase consisting essentially of (1) a major amount of an epoxy resin having an average of from 1.7 to 2.3 epoxide groups per molecule and an epoxide equivalent weight of from about 150 to about 1000, (2) a minor amount of a dihydric compound selected from the group consisting of catechol, resorcinol, hydroxybenzyl alcohols, bis-benzylic alcohol, dihydroxynaphthalenes, and bisphenols of the formula

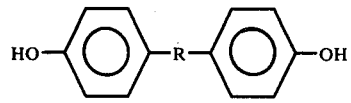

where R is an alkylene group containing 1 to 12 carbon atoms or a bivalent radical containing 1 to 8 atoms of C, O, S, and/or N, (3) a small amount of a liquid carboxylterminated polymer having a polymeric backbone consisting of carbon-carbon linkages and having a weight percent carboxyl content based upon the weight of the polymer of from about 0.5 percent to about 10 percent and a bulk viscosity of from about 500 centipoises to about 2,000,000 centipoises, and (4) as the only curing agent a small amount of one or more amines selected from the group consisting of aliphatic amines and aliphatic heterocyclic amines, said particles having a diameter ranging from about 100 A to about 5μ in width, and (B) a continuous elastomeric phase comprising (1) a major amount of the defined liquid polymer, (2) a minor amount of the defined epoxy resin, (3) a small amount of the defined dihydric compound, and (4) as the only curing agent a small amount of one or more of the defined amines, said vulcanizate having a total composition of 100 parts by weight of epoxy resin, from about 100 parts to about 250 parts by weight of liquid carboxyl-terminated polymer, from about 3 parts to about 36 parts by weight of dihydric compound, and from about 2 parts to about 10 parts by weight of amine.

2. A vulcanizate of claim 1 wherein the epoxy resin is selected from the group consisting of diglycidyl ethers of dihydric phenols and diglycidyl ethers of dialiphatic alcohols, and has a bulk viscosity of from about 200 centipoise to about 2,000,000 centipoise, an epoxide equivalent weight of from about 160 to about 400, and an average of about 2 epoxide groups per molecule.

3. A vulcanizate of claim 2 wherein the liquid carboxyl-terminated polymer has an average of about 1.6 to about 2.4 carboxyl groups per molecule, has a bulk viscosity of from about 5000 centipoise to about 1,000,000 centipoise, and has a polymeric backbone consisting of carbon-carbon linkages derived from interpolymerized units of one or more monomers selected from the group consisting of (a) monolefins containing 2 to about 14 carbon atoms, (b) dienes containing 4 to about 10 carbon atoms, (c) vinyl and allyl esters, (d) vinyl and allyl ethers, and (e) acrylates of the formula

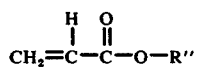

where R'' is selected from the group consisting of alkyl radicals containing 1 to about 18 carbon atoms, an alkoxyalkyl radical, an alkylthioalkyl radical, and a cyanoalkyl radical each containing 2 to about 12 carbon atoms, wherein at least one monomer of (a) to (e) is copolymerized with up to 50% by weight of a monomer selected from the group consisting of (f) vinyl aromatics, (g) vinyl nitriles, (h) methacrylates and ethacrylates, and (i) divinyls and diacrylates.

4. A vulcanizate of claim 3 wherein the bisphenol is selected from the group consisting of methylene bisphenol, butylidene bisphenol, octylidene bisphenol, isopropylidene bisphenol, bisphenol sulfide, bisphenol sulfone, bisphenol ehter, and bisphenol amine.

5. A vulcanizate of claim 4 wherein the amine is selected from the group consisting of N-(2-aminoethyl)piperazine, N-methylpiperazine, piperidine, 2,4,6-tris(N,N-dimethylaminomethyl)phenol, and the 2-ethylhexanoic acid salt of 2,4,6-tris(N,N-dimethylaminomethyl)phenol.

6. A vulcanizate of claim 2 wherein the liquid carboxyl-terminated polymer has an average of about 1.6 to about 2.4 carboxyl groups per molecule, has a bulk viscosity of from about 10,000 centipoise to about 600,000 centipoise, and is comprised of about 5 percent to about 40 percent by weight of acrylonitrile, about 0.5 percent to about 10 percent by weight of carboxyl, and about 50 percent to about 95 percent by weight of butadiene, all weights based upon the total weight of the polymer, said liquid polymer used at from about 140 parts to about 225 parts by weight based on 100 parts of epoxy resin.

7. A vulcanizate of claim 6 wherein the dihydric compound is used at from about 15 parts to about 30 parts by weight based upon 100 parts by weight of the epoxy resin.

8. A vulcanizate of claim 7 wherein the amine is used at from about 4 parts to about 8 parts by weight based on 100 parts by weight of epoxy resin, and the dihydric compound is isopropylidene bisphenol.

9. A vulcanizate of claim 8 wherein the amine is piperidine.

10. A vulcanizate of claim 8 wherein the amine is N-aminoethylpiperazine.

11. A vulcanizate of claim 8 wherein the amine is 2,4,6-tris(dimethylaminomethyl)phenol.

12. A vulcanizate of claim 8 wherein the amine is the 2-ethylhexanoic acid salt of 2,4,6-tris(dimethylaminomethyl)phenol.

* * * * *